United States Patent [19]

Puckett et al.

[11] Patent Number: 4,489,223

[45] Date of Patent: Dec. 18, 1984

[54] BATTERY JUMP CABLE APPARATUS

[75] Inventors: William E. Puckett, Oklahoma City; Ladd M. Adams, Norman, both of Okla.

[73] Assignee: Smart Start Corporation, Oklahoma City, Okla.

[21] Appl. No.: 402,828

[22] Filed: Jul. 28, 1982

[51] Int. Cl.³ .................. H02G 11/02; B65H 75/42; H02J 7/00; G08B 21/00
[52] U.S. Cl. .................. 191/12.2 R; 242/107.13; 242/107.7; 320/2; 320/43; 340/657
[58] Field of Search .............. 191/12.2 R; 242/107.1, 242/107.7, 107.13, 157 R; 307/10 BP; 320/43, 45; 340/657, 696

[56] References Cited

U.S. PATENT DOCUMENTS

| | | | |
|---|---|---|---|
| 3,337,695 | 8/1967 | Brown | 191/12.4 |
| 3,456,181 | 7/1969 | Godshalk | 320/25 |
| 3,700,834 | 10/1972 | Schaefer | 191/12.2 R |
| 3,747,108 | 7/1973 | Ringer | 340/696 X |
| 4,006,952 | 2/1977 | Puckett | 339/5 RL |
| 4,079,304 | 3/1978 | Brandenburg | 320/25 |
| 4,146,282 | 3/1979 | Gay | 339/5 RL |
| 4,154,324 | 5/1979 | Upton et al. | 191/12.2 R |
| 4,157,492 | 6/1979 | Colbrese | 320/25 |
| 4,272,142 | 6/1981 | Zapf | 339/29 B |

Primary Examiner—David A. Scherbel
Assistant Examiner—David F. Hubbuch
Attorney, Agent, or Firm—Dunlap & Codding

[57] ABSTRACT

Apparatus for transferring power from the battery of a service vehicle to the battery of a second vehicle, wherein the final connection between the batteries is made from a remote location via a radio transmitter and a receiver which is mounted in the casing of the apparatus to actuate a solenoid in response to a signal from the transmitter. The circuit between the solenoid and the receiver includes a transistor to control current through the solenoid coil and the base of the transistor is connected to the battery of the second vehicle. Cables used to attach the apparatus to the second vehicle battery are wound on a spool having an interrupted ratchet on one end thereof, the ratchet engaging a ratchet lock that pivots in one direction to hold the reel when the reel is turned in one direction to pay out the battery cables and the ratchet lock pivoting in the other direction within a ratchet wheel interruption to permit free rotation of the reel in the opposite direction for retrieval of the cables on the reel.

14 Claims, 15 Drawing Figures

BATTERY JUMP CABLE APPARATUS

FIELD OF THE INVENTION

The present invention relates generally to battery charging apparatus and more particularly, but not by way of limitation, to battery charging apparatus utilized for transferring power from the battery of a service vehicle to the battery of a second vehicle.

BACKGROUND OF THE INVENTION

As has been discussed in U.S. Pat. No. 4,006,952, issued Feb. 8, 1977 to William E. Puckett, a need exists for a battery charging system which can be mounted in a service vehicle to start stalled vehicles using electrical energy supplied by the battery of the service vehicle. The apparatus disclosed in that patent includes a reel which is disposed in a casing mounted on the service vehicle and upon which jump cables can be wound. Circuitry is supplied for completing an electrical connection between the batteries of the two vehicles following connection of battery clamps, on the ends of the cables, to the battery of the stalled vehicle. Such an apparatus, because of its mobility, provides the useful service of being on call to any motorist who is caught in a situation in which he cannot start his automobile because, for one reason or another, his battery has become discharged.

SUMMARY OF THE INVENTION

The present invention relates to improvements in apparatus of the type described in the aforementioned U.S. Pat. No. 4,006,952. As discussed in such patent, an important consideration in the use of a battery jump cable apparatus is that of safety. The battery being charged will evolve hydrogen gas during charging and, because of this, it is important that the operators of both vehicles be able to isolate themselves from the battery of the stalled vehicle. Should the evolved gas ignite, the stalled vehicle battery can explode to shower a person standing nearby with battery acid. A partial solution to this problem, taught in the aforementioned U.S. Pat. No. 4,006,952, is to place a switch in the circuit that connects the two batteries and mount such switch on the casing of the apparatus so that, by appropriate placement of the service vehicle with respect to the stalled vehicle, the operator of the apparatus can position himself a safe distance from the battery of the stalled vehicle when he initiates the supply of electrical energy thereto. However, this solution is only a partial one; circumstances in which the apparatus is used may not permit the operator to place the service vehicle so that safety is insured. The present invention provides a complete solution by including a radio link in the circuit to operate a switch that makes the final connection between the two batteries. The transmitter of this link can be operated at a distance from both vehicles or from the cab of the service vehicle to insure complete safety to the operator of the apparatus and the driver of the stalled vehicle. In addition, the capability of the apparatus to be operated from any position within the range of the transmitter permits the operator to meet any exigency that might arise in the use of the battery jump cable apparatus. For example, the operator can carry out the energy transfer function of the apparatus from the driver's seat of the stalled vehicle should circumstances arise in which it would be useful for him to do so.

The improved battery jump cable apparatus of the present invention is also provided with an improved reel assembly for the jump cables which facilitates the connection of the two batteries. To this end, the reel is provided with a ratchet wheel that has a plurality of interruptions spaced about its periphery and a ratchet lock that is pivotally mounted on a frame that supports a spool forming a portion of the reel to engage teeth formed in the periphery of the ratchet wheel between the interruptions. The ratchet lock is spring loaded to have a neutral position from which it will pivot in one direction to lock the reel and from which it will pivot in the opposite direction to permit the reel to freely rotate so as to take up the jump cables on the spool. The interruptions permit the operator of the apparatus to reverse the direction in which the ratchet lock has been pivoted. That is, if the ratchet lock has been pivoted in a direction to cause the reel to be locked, the cables can be drawn from the apparatus an additional distance to align an interruption with the ratchet lock so that the ratchet lock will move to its neutral position within the interruption. If the force on the cables is then relaxed, so that the reel, which is also spring loaded, begins to take up the battery jump cables, one side of the interruption will engage the ratchet lock to pivot the ratchet lock in a direction for free take-up of the jump cables. Similarly, if the ratchet lock is pivoted in a direction to cause free take-up of the cables, it can be shifted to a locking condition by stopping the reel, via a force on the cables, at a location in which an interruption in the ratchet wheel is aligned with the ratchet lock. When the cables are subsequently pulled from the spool, one side of the interruption engages the ratchet lock to pivot it in a direction to lock the reel.

An important object of the present invention is to provide a battery jump cable apparatus which can be operated safely under any circumstances that might be encountered in the field.

Another object of the invention is to provide versatility in the use of a battery jump cable apparatus by freeing the operator of the apparatus from having to be in any particular location to operate the apparatus.

Yet another object of the invention is to provide a battery jump cable apparatus which facilitates the paying out and retrieval of jump cables by means of which the battery of a stalled vehicle is connected to the battery of a service vehicle.

Other objects, advantages and features of the present invention will become clear from the following detailed description of the preferred embodiment of the invention when read in conjunction with the drawings and appended claims.

DESCRIPTION OF THE PREFERRED EMBODIMENT

Figure 1:
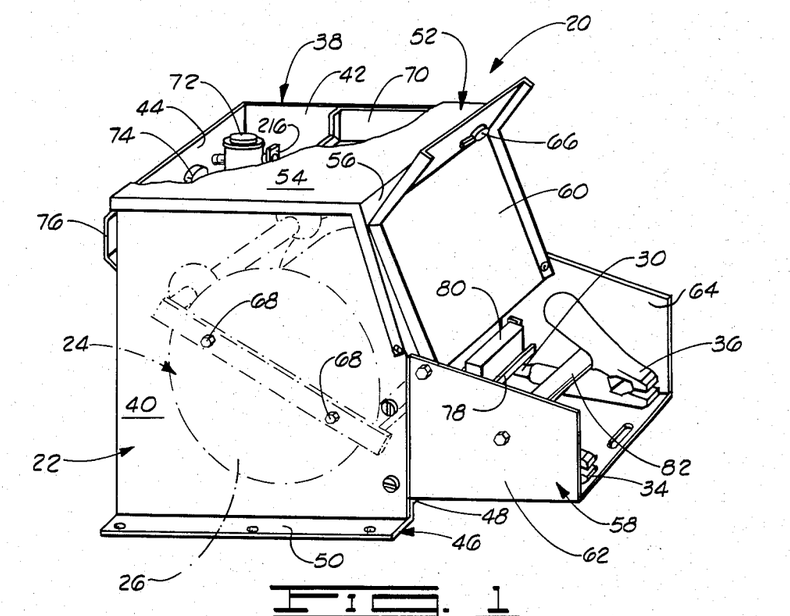
FIG. 1 is a perspective view in partial cutaway of a battery jump cable apparatus constructed in accordance with the present invention.

Referring now to FIG. 1, shown therein and designated by the general reference numeral 20 is a battery jump cable apparatus constructed in accordance with the present invention. As shown therein, the apparatus 20 generally comprises a casing 22, which can be mounted on a service vehicle (not shown), a reel 24 mounted within the casing 22 and including a pivotable spool 26 upon which battery jump cables 28 and 30 (FIG. 2) can be wound, and an energy transfer circuit 32 (not numerically designated in FIG. 1) which will be discussed below with reference to FIG. 15. It is contemplated that one pole of the battery of the service vehicle will be grounded to the frame of the vehicle and, in such case, the casing 22 forms one input terminal to the circuit 32 as will be discussed below. Conventional battery clamps 34 and 36, forming output terminals for the circuit 32, are connected to ends of the cables 28 and 30, respectively, such ends being referred to herein as free ends of the cables 28 and 30. The opposite ends of the cables 28 and 30 are fixed on the spool 26 in a manner to be discussed below.

The casing 22, which is preferably constructed of sheet metal, comprises a wall forming member 38 having three vertically disposed panels 40, 42 and 44 forming, respectively, opposed first and second side walls and a connecting rear wall of the casing 22 as shown in FIG. 1. A floor for the casing 22 is formed by a floor member 46 comprised of a floor panel 48 having depending legs (only one depending leg, designated 50 in FIG. 1, has been illustrated) which engage the interiors of the panels 40 and 42 and are secured thereto by spot welding. Flanges extending laterally of the legs of the floor panel, such as the flange 50 shown in FIG. 1, provide a convenient means for mounting the casing 22 on the service vehicle, the flanges being provided with a plurality of holes to accept suitable fasteners for this purpose. The top of the casing 22 is closed by a cover 52 having a first portion 54 that extends across the casing 22 and a second portion 56 that extends downwardly from the first portion 54 to close upper portions of the casing 22 opposite the rear wall panel 44. The cover 52 is conveniently secured to the wall forming member 38 via sheet metal screws to permit the cover 52 to be removed for inserting the reel 24 into the casing 22 and for servicing portions of the apparatus 20 disposed within the casing 22. The remainder of the open end of the casing 22, opposite the wall 44, receives a U-shaped clamp storage compartment member 58, one end of which is inserted into the opening below the second portion 56 of the cover 52 and secured to the panels 40 and 42, and a lid 60 which pivotally attaches to vertical panels 62 and 64 of the member 58. As can be seen from FIG. 1, the lid 60 is formed so that the lid 60 can be pivoted to a position (not shown) in which the lid 60 closes the top of the compartment formed by member 58 and the end thereof opposite the attachment of the member 58 to panels 40 and 42. A conventional locking device 66 is mounted on the lid 60 to secure the lid in the closed position.

The casing 22 is adapted for ready mounting of the reel 24 therein by means of holes (not shown) formed through the side wall panels 40 and 42 to pass screws, such as the screws 68 shown on the panel 40 in FIG. 1, that screw into portions of the reel 24. In addition, a shelf 70 is secured to the interior surfaces of the panels 40 and 42, below the cover 52, to receive a circuit board (not shown) upon which components of the circuit 32 can be mounted. The circuit 32 also comprises an automobile starting solenoid 72 (represented as a relay in FIG. 15) and a horn 74 which are secured to the rear wall panel 44 of the casing 22. One terminal of the solenoid 72, internally connected to normally open contacts thereof, form the second input terminal to the circuit 32. This terminal is connected to the non-grounded pole of the service vehicle battery and such connection is enabled by mounting the solenoid 72 on the casing 22 via such terminal of the solenoid 72 with conducting portions thereof extending through a hole (not shown) formed through the rear wall 44 of the casing 22. A cover 76 is attached to the wall 44 to enclose the protruding portions of such terminal of the solenoid 72.

Fittings for the casing 22 further comprise a shelf 78 attached to the panels 62 and 64 of the clamp storage member 58 to extend across the compartment formed by the member 58 and a shaft 82 which is bolted to the panels 62 and 64 and extends therebetween. At such times that the apparatus 20 is not in use, a radio transmitter 80, used to make the connection between the battery of the service vehicle and the battery of a stalled vehicle as will be discussed below, is carried within the shelf 78. As will further be discussed below, the spool 26 is spring-loaded for automatic retrieval of the cables 28 and 30 and the clamps 34 and 36 are engaged with the shaft 82, as shown in FIG. 1, when the cables 28 and 30 are wound on the spool 26. Such engagement between the clamps 34 and 36 and the shaft 82 presents the clamps 34 and 36 to the operator of the apparatus 20 for ready withdrawal of the cables 28 and 30 when the apparatus 20 is used.

The reel 24, which is particularly shown in FIGS. 2-8, is generally comprised of: a frame 84; the spool 26; a spiral spring 86 (see FIG. 6 and 8); a ratchet wheel 88; a ratchet lock 90; and a roller 92. The spool 26 is rotatably mounted within the frame 84 for rotation about a lateral axis 94 (FIG. 2) of the frame 84 and is positioned along the axis 94 by two brush assemblies 96 and 98 whose construction will be discussed below with reference to FIGS. 9-11.

Figure 3:
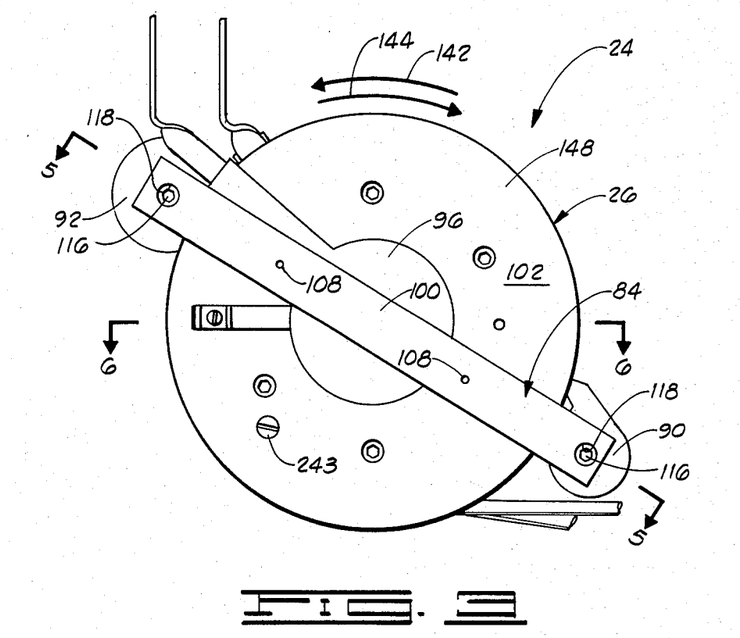
FIG. 3 is an elevational view of one side of the reel.
Figure 4:
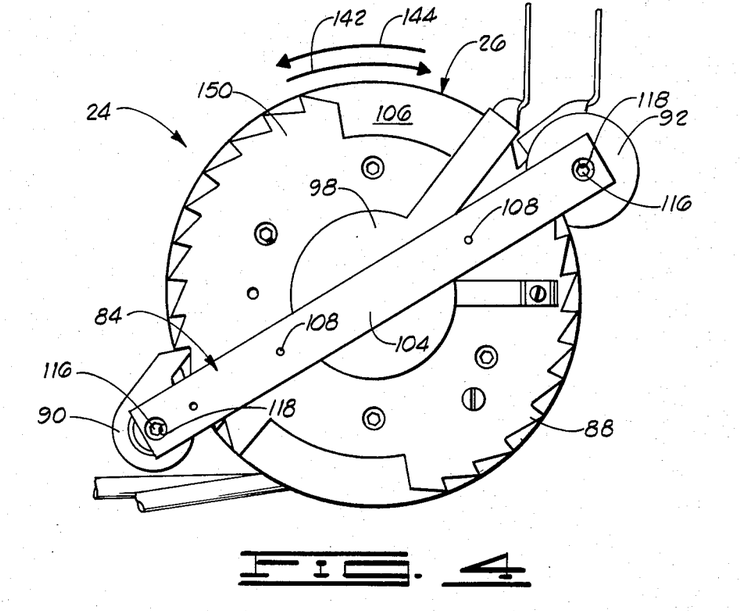
FIG. 4 is an elevational view of the opposite side of the reel.

The frame 84 comprises a first cross arm 100, which extends across a first end 102 of the spool 26, and a second cross arm 104 which extends across the opposite, second end 106 of the spool 26 parallel to the cross arm 100. Threaded holes 108, shown in FIGS. 3 and 4, are formed through the cross arms to receive the screws 68 passed through the above noted holes in the side walls 40 and 42 of the casing 22, thereby securing the reel 24 within the casing 22.

Figure 2:
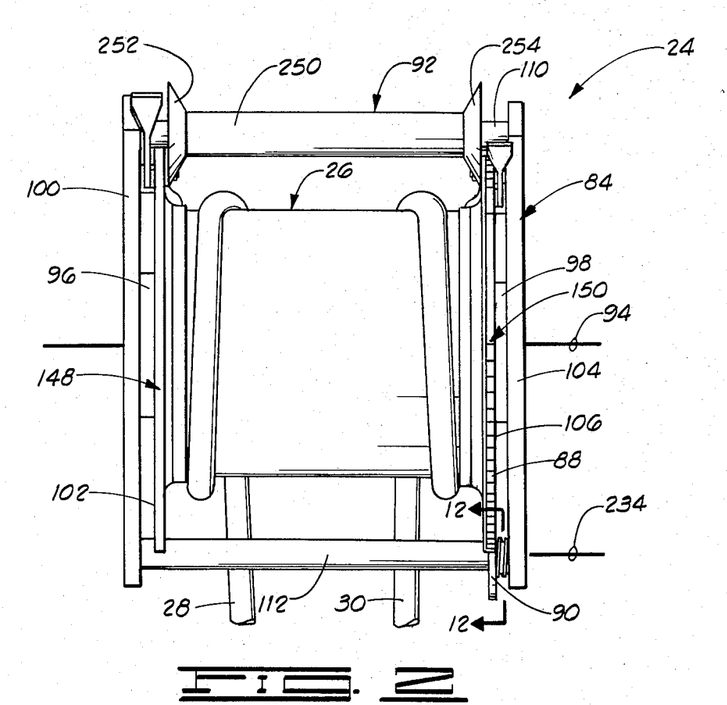
FIG. 2 is a plan view of the reel of the battery jump cable apparatus of FIG. 1.
Figure 5:
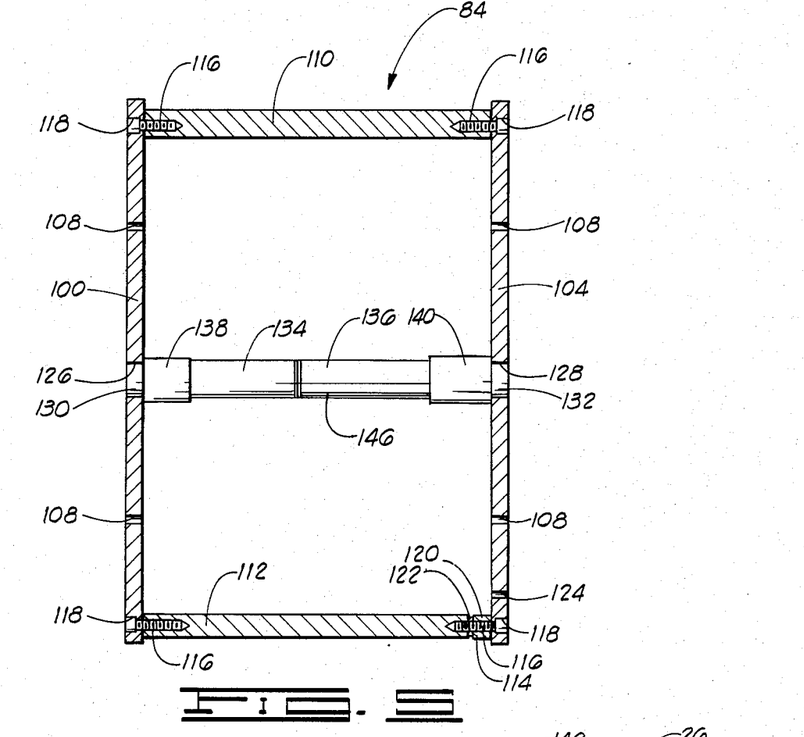
FIG. 5 is a sectional plan view of the frame of the reel taken along line 5—5 of FIG. 3.

As is particularly shown in FIGS. 2 and 5, the frame 84 further comprises a first shaft 110 which is bolted to each of the cross arms 100 and 104, near one end of each of the arms 100 and 104, to secure these ends of the cross arms to each other. The opposite ends of the cross arms 100 and 104 are similarly secured to each other, as shown in FIG. 5, via a second shaft 112 and a spacer 114. In particular, the ends of the shafts 110 and 112 are provided with axially extending, threaded holes (not numerically designated in the drawings) into which bolts 116, disposed in recesses 118 in the arms 100 and 104 and extending through holes (not numerically designated in the drawings) through the cross arms 100, 104, extend. The spacer 114 has a full diameter portion 120 adjacent the second cross arm 104; that is, a portion having the same diameter as the second shaft 112, and a reduced diameter portion 122 adjacent the second shaft 112 so that the combined second shaft 112 and spacer 114 form a link between the cross arms 100 and 104 that includes a circumferential groove near the second cross arm 104. Such groove is used to mount the ratchet lock 90 on the frame 84 as will be discussed below. As will be further discussed below, the ratchet lock 90 is spring biased to assume a neutral position in the absence of a pivoting moment exerted thereon and a hole 124 is formed through the second cross arm 104 to provide an anchor for such spring biasing.

Figure 6:
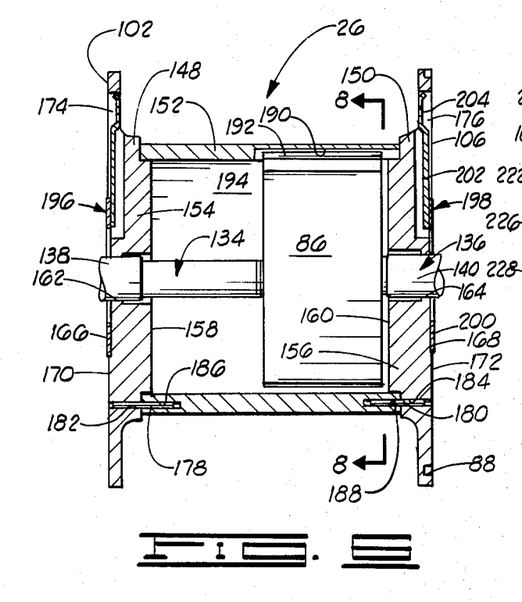
FIG. 6 is a cross section in plan view of the spool of the reel taken along line 6—6 of FIG. 3.

Near their centers, the cross arms 100 and 104 are provided with coaxial mounting apertures 126 and 128 respectively to receive reduced diameter portions 130 and 132 of first and second stub axles 134 and 136. The reduced diameter portions 130 and 132 are welded to the arms 100 and 104 and, in the assembled frame 84, the axles 134 and 136 extend toward each other to abut near the center of the frame 84. Bearing portions 138 and 140 are formed on the axles 134 and 136 respectively to support the spool 26 for rotation in the frame 84 as indicated in FIG. 6. As will be discussed below, the spool is rotatable in first and second directions indicated by numerals 142 and 144 respectively, such directions being shown in FIGS. 3, 4 and 7, and the spool is biased to rotate in the second direction 144 by the spring 86. The spring 86 is disposed within the spool 26 to extend about the second stub axle 136 and an axially extending slot 146 is formed through portions of the second stub axle 136, between the bearing portion 140 thereof and the first stub axle 134, to receive one end of the spring 86 and secure such end of the spring 86 to the frame 84. The spring 86 is secured to the second stub axle 136 by means of a right angle bend formed adjacent portions of the spring extending through the slot 146 (see FIG. 8) and via the abutment of the stub axles 134 and 136.

The construction of the spool 26 and the mounting of the spool 26 on the frame 84 are perhaps best shown in FIG. 6 which includes the stub axles 134 and 136, as well as the spring 86, in a cross-sectional view of the spool 26. Adjacent its first end 102, the spool 26 comprises a first end plate 148 which, as shown in FIG. 3, is circular in form. The first end plate 148 is constructed of an electrically insulating material, preferably a high impact plastic, for reasons which will become clear below. Adjacent its second end 106, the spool 26 similarly comprises a circular, electrically insulating second end plate 150 which is positioned substantially parallel to the first end plate 148. The spool 26 further comprises a tubular body portion 152 which is bolted to each of the end plates 148 and 150, the end plates 148 and 150 having circular lands 154 and 156 formed on facing interior surfaces 158 and 160 thereof to slide within the body portion 152 so that the end plates 148 and 150 will be disposed in a coaxial, parallel relation in the assembled spool 26 by the tubular body portion 152. Circular apertures, 162 and 164, centered on the axes of the end plates 148 and 150, are formed through the end plates 148 and 150 respectively to receive, and rotate upon, the bearing portions 138 and 140 of the stub axles 134 and 136.

Circular depressions 166 and 168 are formed in exterior sides 170 and 172 of the end plates 148 and 150 respectively to partially mount first and second connecting assemblies (not numerically designated in the drawings) on the ends 102 and 106 of the spool 26. The connecting assemblies, which are used to electrically connect the fixed ends of the cables 28 and 30 to remaining portions of the energy transfer circuit 32, will be discussed below. In addition, radially extending grooves 174 and 176 are formed in the exterior surfaces 170 and 172 of the end plates 148 and 150, the grooves 174 and 176 intersecting the depressions 166 and 168 and extending therefrom toward the peripheries of the end plates 148 and 150. As shown in FIG. 6, portions of the grooves 174 and 176 near the peripheries of the end plates 148 and 150 extend through the end plates 148 and 150, to intersect the interior surfaces thereof for a purpose to be discussed below.

In the assembled spool 26, the groove 176 is positioned parallel to the groove 174, such alignment being provided by pins 178 and 180 which extend through alignment holes 182 and 184 formed through the end plates 148 and 150 and into corresponding alignment holes 186 and 188 formed in the tubular body member 152 of the spool 26. As has been indicated for the alignment hole 184 in FIG. 7, the alignment holes 182 and 184 are positioned in the end plates 148 and 150 so as to be in diametric opposition to the grooves 174 and 176 and, as shown in FIG. 6, the alignment holes in the body member of the spool 26 are formed in a line to insure parallel alignment of the grooves 174 and 176 when the spool 26 is assembled.

Figure 8:
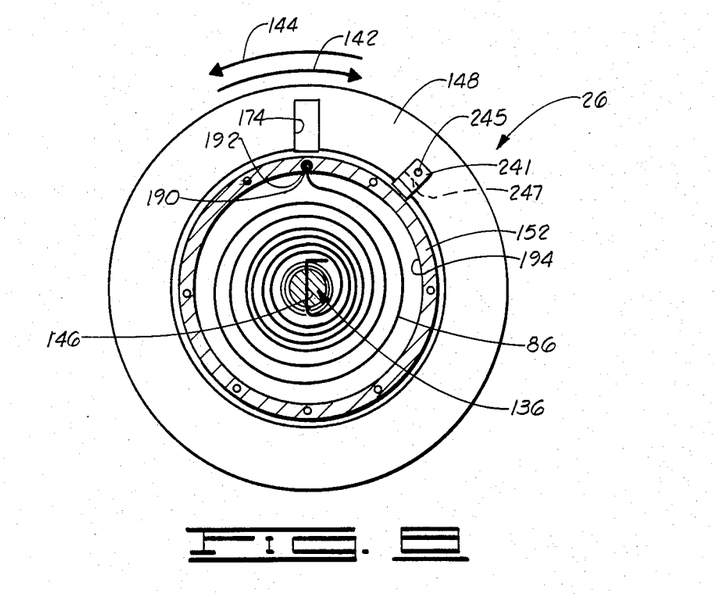
FIG. 8 is a cross section of the spool taken along line 8—8 of FIG. 6.

FIGS. 6 and 8 illustrate the manner in which the spring 86 is secured to the spool 26 so as to bias the spool 26 toward rotation in the second direction 144 on the frame 84. In particular, a spring securing hole 190 is formed in the end of the tubular body member 152 of the spool 26 that is adjacent the second end plate 150 to receive a rolled portion 192 of the spring adjacent the outermost end thereof. The hole 190 intersects the inner periphery 194 of the tubular body member 152 to permit the spring 86 to enter the hole 190 from the interior of the tubular body member 152.

The connecting assemblies, which are partially supported by the depressions 166 and 168 in the ends of the end plates 148 and 150 of spool 26, are comprised of the brush assemblies 96 and 98 and contactors 196 and 198 shown in cross section in FIG. 6. The contactors 196 and 198 each comprise a metal ring 200 (the ring 200 has been designated only for the contactor 198) which fits into the depression 166 or 168 in the end of one of the end plates 148 or 150 and further comprises a metal tab 202 that is soldered to the ring 200 and extends from the depression toward the periphery of the end plate 148 or 150 within the groove 174 or 176 formed in the outer surface of such end plate. (Only the tab of the contactor 198 has been so designated in the drawings.) Near the radially outermost end of the tab 202, a hole 204 is formed therethrough so that the tab can be bolted to the fixed end of one of the jump cables 28 or 30 via the portions of the grooves 174 and 176 that extend through the end plates 148 and 150 to intersect the interior sides 158 and 160 thereof. The electrical connection from the cables to remaining portions of the energy transfer circuit 32 is then continued by the brush assemblies 96 and 98, one of which has been illustrated in FIGS. 9 and 10. (The brush assemblies 96 and 98 are substantially identical so that the construction of only the brush assembly 96 has been illustrated in the drawings. A minor difference that does exist between the brush assemblies will be noted below.)

Figure 9:
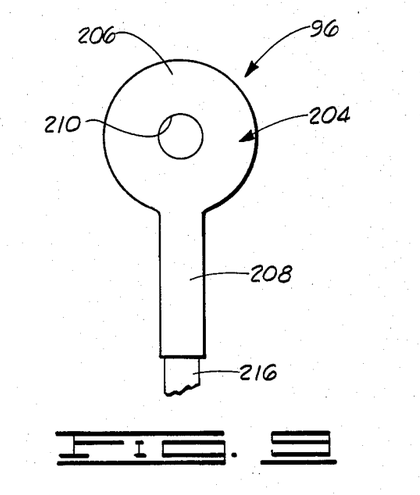
FIG. 9 is an elevational view of one side of a brush assembly used in the battery jump cable apparatus.
Figure 10:
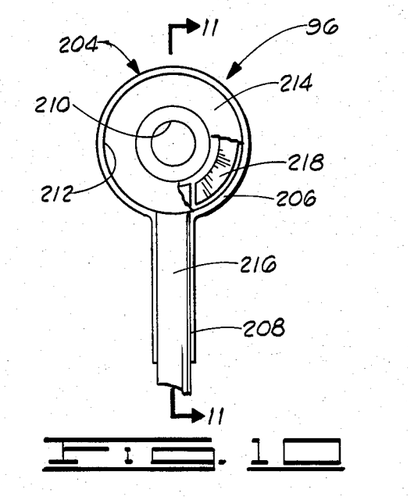
FIG. 10 is an elevational view in partial cutaway of the opposite side of the brush assembly shown in FIG. 9.
Figure 11:
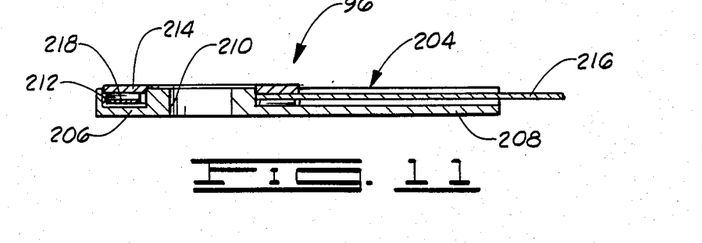
FIG. 11 is a cross section of the brush assembly taken along line 11—11 of FIG. 10.

As shown in FIGS. 9-11, the brush assembly 96 comprises an insulated sleeve 204 having a circular portion 206 at one end thereof and an elongated portion 208 extending radially from the circular portion 206 to the opposite end thereof. A circular hole 210 is formed through the circular portion 206 to slip on the bearing portion of one of the stub axles 134 or 136 and the sleeve 204 is constructed to have a thickness such that the brush assemblies 96 and 98 will center the spool 26 on the frame 84 when the spool 26 and the brush assemblies 96 and 98 are mounted on the frame as indicated in FIG. 2.

Concentrically with the hole 210, a circular groove 212 is formed in the side of the sleeve 204 that will be placed into abutment with one end of the spool 26 when the reel 24 is assembled and such groove is continued through the elongated portion 208 of the sleeve 204. The brush assemblies 96 and 98 each further comprise a slip ring 214, which is disposed within portions of the groove 212 formed in the circular portion of the sleeve 204, and a bus 216. The bus 216 is soldered to the slip ring to extend through portions of the groove 212 in the elongated portion 208 of the sleeve 204 to provide electrical conducting paths to the rings 200 of the contactors 196 and 198 and, thence, to the cables 28 and 30. The connection to remaining portions of the circuit 32 is made by bolting the bus 216 of the brush assembly 96 to the casing 22 after the reel 24 has been mounted in the casing 22 and by bolting the bus 216 of the brush assembly 98 to a terminal on the solenoid 72 as has been shown in FIG. 1. Such terminal of the solenoid 72 connects to the side of the normally open internal contacts thereof opposite the side connected to the nongrounded pole of the service vehicle battery so that electrical contact can be made between the batteries of the vehicles by attaching the clamps 34 and 36 to the second vehicle battery and energizing the coil of the solenoid 72 to close the internal contacts thereof. An arcuate strip spring 218 is disposed in circular portions of the groove 212 to urge the slip ring 214 against the ring 200 of the contactor that will be adjacent the slip ring 214 when the reel 24 is assembled. The two brush assemblies 96 and 98 differ only in that the bus of assembly 98 is shorter than the bus of assembly 96 to adjust for the separation between the bus of assembly 96 and the casing 22 resulting from connecting the bus of assembly 98 to the solenoid 72 rather than to the casing 22 as is the case for the bus of assembly 96.

Figure 7:
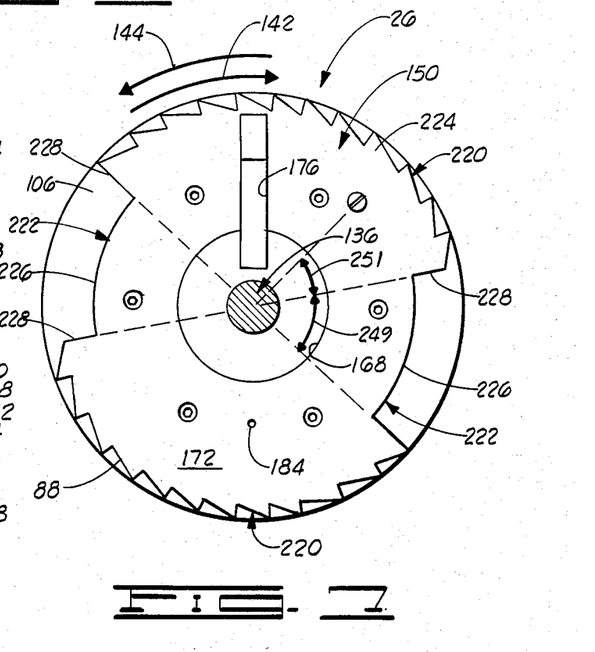
FIG. 7 is an elevational view of one end of the spool showing the ratchet wheel of the reel.

In the preferred embodiment of the invention, the ratchet wheel 88 is formed unitarily with the second end plate 150 of the spool 26 as has been particularly indicated in FIGS. 2, 6 and 7. Accordingly, the ratchet wheel 88 will be automatically centered on the axis 94 about which the spool rotates and will be automatically positioned in the frame 84 when the spool 26 and brush assemblies 96 and 98 are mounted on the frame 84. Such automatic centering and positioning of the ratchet wheel 88 facilitates the mounting of the ratchet lock 90 to coact with the ratchet wheel 88 to alternatively hold and release the spool as will become clear below.

In a preferred form, the ratchet wheel 88 comprises two first segments 220 and two second segments 222 as indicated by dashed lines in FIG. 7. The first segments 220 are provided with a plurality of teeth 224 formed along an arc of a circle centered on the spool axis and of a radius substantially the same as the radius of the second end plate 150. The second segments 222 are interspersed between the first segments 220 and have peripheries 226 formed on a radius considerably smaller than the radii of the arcs along which the teeth 224 are formed. The purpose of these dimensions is to enable the ratchet lock 90 to pivot freely within interruptions in the ratchet wheel periphery defined by the reduced radii of the second segments 222 and edges 228 of the first segments 220 adjacent the teeth 224. These interruptions enable a reversal in modes of operation of the reel 24 during use of the apparatus 20 in a manner that will be discussed below.

Figures 12, 13, 14:
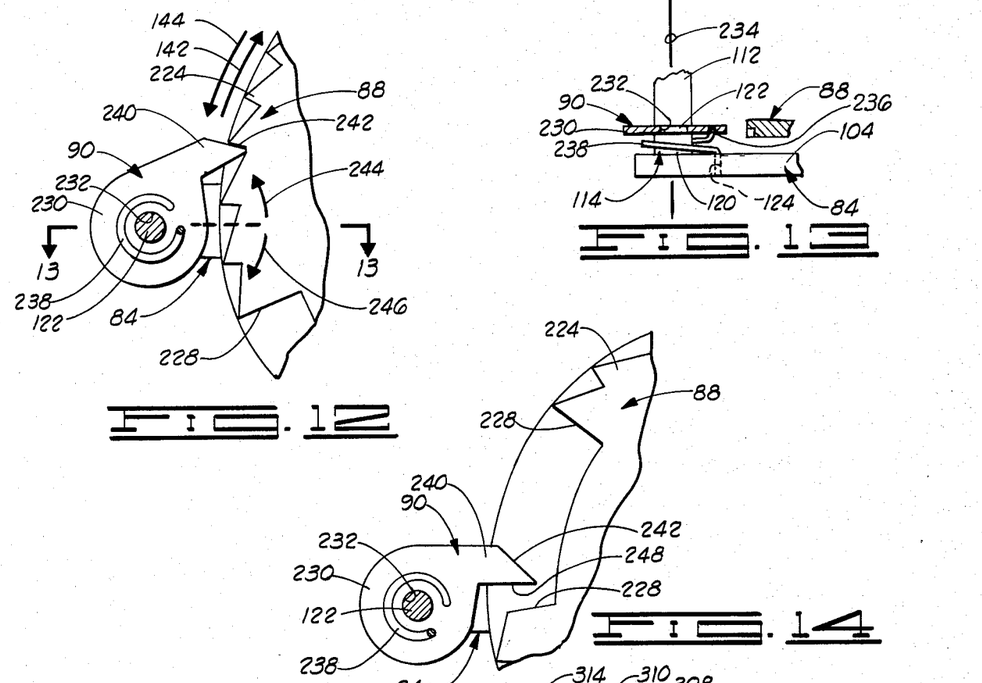
FIG. 12 is a side elevational view of the ratchet lock for the reel showing the manner in which the ratchet lock and ratchet wheel lock the reel against rotation.
FIG. 13 is a sectional plan view of the ratchet lock taken along line 13—13 of FIG. 12.
FIG. 14 is a side elevational view of the ratchet lock similar to FIG. 12 for another position of the ratchet wheel.

The ratchet lock 90, its mounting on the frame 84, and its coaction with the ratchet wheel 88 have been particularly shown in FIGS. 12-14 to which attention is now invited. As shown in these Figures, the ratchet lock 90 has the general form of a plate comprised of a generally circular body portion 230 having a circular hole 232 formed therethrough for mounting the ratchet lock 90 on the frame 84 for pivotation about an axis 234 which has been shown in FIG. 13, such axis extending axially of the second shaft 112 of the frame 84 such that the axis 234 will be parallel to, and spaced from, the axis of pivotation 94 of the spool 26 as shown in FIG. 2.

As is particularly shown in FIG. 13, the diameter of the hole 232 is substantially equal to the diameter of the reduced diameter portion 122 of the spacer 114 and the thickness of the ratchet lock 90 is substantially equal to the length of the portion 122 of the spacer 114 to provide for the pivotal mounting of the ratchet lock 90 on the frame 84 during assembly of the reel 24. Alignment of the ratchet lock 90 with the ratchet wheel 88 is insured following such assembly by making the length of the full diameter portion 120 of the spacer 114 substantially equal to the thickness of the sleeves 204 of the brush assemblies 96 and 98 and the use of the brush assemblies 96 and 98 to position the spool 26 on the frame 84.

With continuing reference to FIG. 13, an off center hole 236 is formed through the body portion 230 of the ratchet lock 90 to receive one end of a helical spring 238, the other end of the spring 238 being disposed in the hole 124 formed through the second cross arm 104 of the frame 84. In a relaxed state of the spring 238, the spring 238 positions the ratchet lock 90 in a neutral position shown in FIG. 14 and the spring 238 urges the ratchet lock 90 towards such position at such times that the ratchet lock 90 is pivoted to either side of the neutral position.

The ratchet lock 90 has a protruding nose 240 that extends generally toward the axis of the spool 26 and is of a length sufficient to engage the teeth 224 on the first segments of the ratchet wheel 88 but insufficient to engage the second segments of the ratchet wheel 88. Further, the nose 240 has a sloping edge 242 formed on one side thereof to provide the reel 24 with an asymmetry of operation. In particular, the reel 24 has a locking mode, shown in FIG. 12, in which the ratchet lock 90 has been pivoted in a first direction 244 from the neutral position thereof to engage the teeth 224 of the ratchet wheel 88 and lock the ratchet wheel 88 against rotation in the second direction 144 of the spool 26 that would otherwise be caused by the spring 86 disposed within the spool 26. The ratchet lock 90 can also be pivoted in a second direction 246 to define a free rotation mode of operation for the reel 24. In this free rotation mode, the edge 242 of the nose 240 is substantially tangent to the periphery of the ratchet wheel 88 so that the teeth 224 of the ratchet wheel will slip on the nose of the ratchet lock 90 so as to permit the spool 26 to be turned in either the first or second directions 142 and 144 thereof when the ratchet lock 90 is pivoted in the direction 246. In particular, when the ratchet lock 90 is pivoted in the direction 246, the spool is free to turn in the second direction 144 thereof. As can be seen by comparing FIGS. 2 and 3, rotation of the spool 26 in the second direction 144 will cause the cables 128 and 130 to be wound on the spool 26.

The manner in which the interruptions formed in the periphery of the ratchet wheel 88 permit transitions between the two operational modes of the reel 24 can be seen by reference to FIG. 14. At such times that the ratchet lock nose 240 is aligned with one of the second segments of the ratchet wheel 88, the spring 238 will cause the ratchet lock 90 to move to the neutral position thereof. If it is desired that the reel 24 thereafter be in the locking mode, it is necessary only that the cables 28 and 30 be pulled to cause a rotation of the spool 26 in the first direction 142 such that the edge 228 of the first ratchet wheel segment disposed below the ratchet lock in FIG. 14 engages the side 248 of the ratchet lock nose 240. Such engagement will pivot the ratchet lock in the first direction 244 so that, if tension on the cables is released while the nose 240 engages a first segment of the ratchet wheel 88, the nose 240 will enter a ratchet wheel tooth as shown in FIG. 12 to hold the spool against rotation in the second direction 144. Conversely, should it be desired that the reel 24 subsequently be in the free rotation mode, it is necessary only to relax the force on the cables 28 and 30 to permit the edge of the first segment above the ratchet lock in FIG. 14 to engage the edge 242 of the ratchet lock nose and pivot the ratchet lock in the second direction 246 which, as described above, permits the spool 26 to be driven in the second direction 144 of rotation thereof by the spring 86. Thus, transitions between the two modes of rotation of the reel 24 can be accomplished by pulling on the cables 28 and 30, at such times that the reel 24 is in the locking mode, or relaxing the tension in the cables, at such times that the reel 24 is in the free rotation mode, sufficiently to align the ratchet lock 90 with one of the second segments of the ratchet wheel 88. Thereafter, the reel 24 can be placed in either mode of operation, as desired by the user of the apparatus 20, by either pulling on the cables 28 and 30 to place the reel 24 in the locking mode or by relaxing the tension on the cables to place the reel 24 in the free rotation mode.

Referring once again to FIG. 8, the reel 24 further comprises a cable clamp 241 which is bolted to the interior surface of the first end plate 148 via a screw 243 (FIG. 3) that passes through the end plate 148 to screw into a threaded hole 245 formed through the clamp 241. A circular groove, indicated by the dashed line designated 247 in FIG. 8, is formed in the underside of the clamp 241 to extend between the sides thereof so that the cable 28 (not shown in FIG. 8) can be securely attached to the end plate 148. Specifically, the groove 247 is placed about the cable 28 when the cable 28 is mounted on the reel 24 and the screw 243 is then tightened to secure portions of the cable 28 near the fixed end thereof to the reel. A similar cable clamp, (not shown) is provided for the cable 30.

In addition to securing the cables 28 and 30 to the reel 24, the cable clamps serve a second purpose as will now be discussed. Referring once again to FIG. 12, it will be clear that, when the reel 24 is in the locking mode thereof, a transition to the free rotation mode can be accomplished only by turning the spool in the first direction 142; that is, a direction in which the cables 28 and 30 are stripped from the spool 26. Thus, should it occur that the reel 24 is in the locking mode at a time that all of the cables 28 and 30 have been stripped from the spool 26, the reel 24 will become jammed. That is, the spool 26 could not be turned in the second direction 144 because of the coaction between the ratchet wheel 88 and ratchet lock 90 and the spool 26 could not be turned in the first direction 142 because, to do so, would require drawing an additional length of cable, which is not available, from the reel 24. The cable clamps, by means of which the cables are secured to the end plates of the spool, are positioned on the spool to prevent such jamming from occurring. In particular, the clamps are positioned on the spool such that, at the limit of rotation of the spool in the first direction 142, defined by the position of the cable clamps, the nose 240 of the ratchet lock 90 will be aligned with one of the second segments 222 of the ratchet wheel 88. In one preferred embodiment of the reel 24, such condition has been accomplished as has been indicated in FIG. 7. In such embodiment, the ratchet wheel 88 is provided with two second segments 222 and the angle 249 that reel segment 222 subtends is 60 degrees. The ratchet wheel 88 is made symmetric by separating the second segments 222 with first segments 220 which each subtend an angle of 120 degrees. The clamps are then mounted on the spool end plates at an angle 251 of 37.5 degrees in the second direction 144 from one of the second segments 222 of the ratchet wheel 88 to achieve the desired condition that the nose 240 of the ratchet lock 90 align with a second segment of the ratchet wheel 88 at the limit of rotation of the spool in the first direction 142. The above described alignment of the end plates 148 and 150, coupled with identical positioning of the clamps on the end plates, insures that both cables define the same limit of rotation of the spool in the first direction 142.

The roller 92, mounted on the first shaft 110 of the frame 84 as shown in FIG. 2, is used to achieve uniform winding of the cables 28 and 30 on the spool 26, to contribute to compactness of the reel 24, as will now be described. As shown in FIG. 2, the roller 92 is of a length slightly less than the separation of the end plates 148 and 150 of the spool 26 at the outer peripheries of the end plates so that the roller 92 which has an axial bore (not shown) formed therethrough for free rotation on the shaft 110, can be disposed between the end plates 148 and 150 in the assembled reel 24. The roller 92 comprises a central body portion 250 and two enlarged end portions 252 and 254 that are disposed at the ends of the body portion 250. The surfaces of these end portions 252 and 254 that face each other are shaped to have a frusto-conical configuration as has been shown in FIG. 2. It has been found that such shaping of the roller 92 will result in the cables 28 and 30 being guided into substantially uniform laps on the spool 26 when the cables 28 and 30 are wound thereon. In particular, should the winding of the cables 28 and 30 on the spool 26 become non-uniform, the cables will tend to overlap adjacent the end plates 148 and 150 so that they can be engaged by the frusto-conical surfaces of the end portions 252 and 254 of the roller 92. Such engagement, because of the shape of these portions of the roller 92, shifts the cables parallel to the spool axis 94 to eliminate the overlapping of the cables on the spool 26 and thereby causes the cables 28 and 30 to be wound substantially uniformly on the spool 26. Such uniform winding of the cables 28 and 30 permits the frame 84 to be made only slightly larger than the spool 26 without possible engagement between the cables and the frame that could otherwise cause the reel 24 to become jammed.

Figure 15:
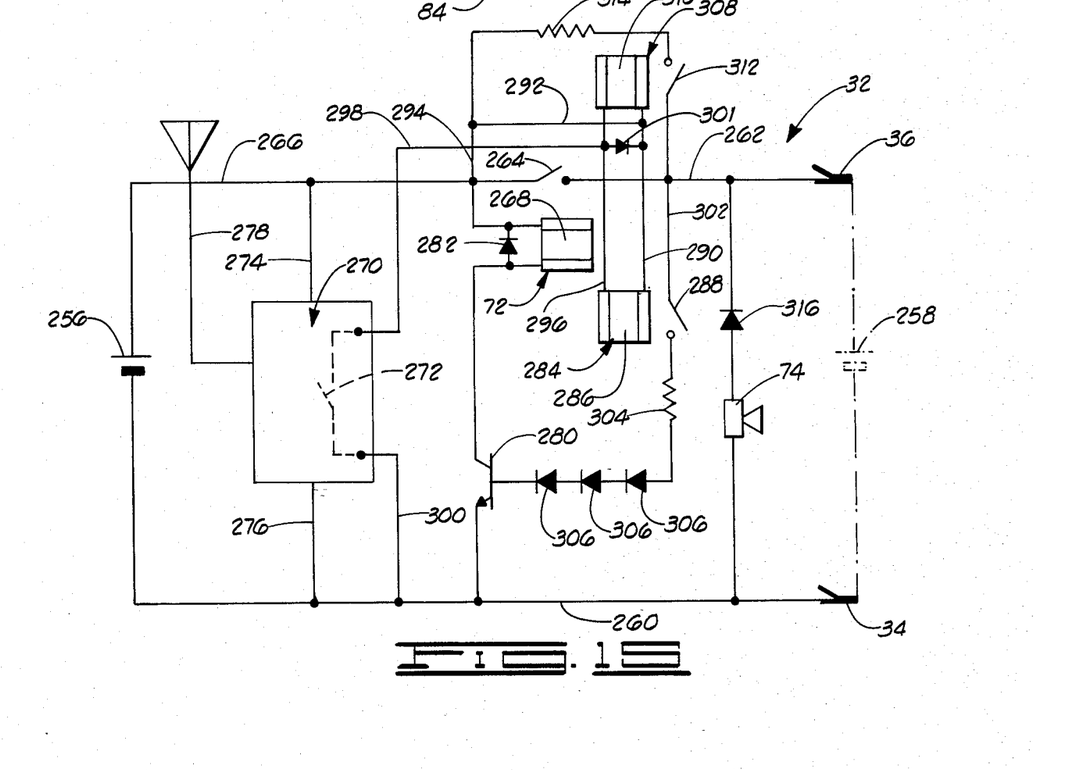
FIG. 15 is a schematic representation of the circuit of the battery jump cable apparatus.

Referring now to FIG. 15, shown therein is a schematic diagram of the energy transfer circuit 32 by means of which the battery of a stalled vehicle is charged from the electrical system of the service vehicle. The battery of the service vehicle is indicated at 256 and the battery of the stalled vehicle, shown in phantom lines, at 258. Connection to the battery 258 is via the clamps 34 and 36 which have also been schematically illustrated in FIG. 15. The connection between the service vehicle battery 256 and the clamp 34 is, as noted above, made by grounding one pole of the battery 256 to the service vehicle frame and grounding the clamp 34 to the service vehicle frame through the connection of the bus 216 of the brush assembly 96 to the casing 22 which is mounted on the service vehicle so as to be in electrical contact with the service vehicle frame. (FIG. 15 has been drawn for the case in which the negative pole of the battery 256 is the pole that is grounded to the vehicle frame.) The clamp 34 is connected to the bus of the brush assembly 96 via the connection of the clamp 34 to the cable 28, the connection of the fixed end of the cable 28 to the contactor 196 and the contact between the slip ring of the brush assembly 96 and contactor 196 that has been described above. In FIG. 15, the electrical path between clamp 34 and battery 256 has been represented as a conducting path 260. Similarly, the electrical connection between the clamp 36 and one side of the normally open contacts 264 of the solenoid 72, such path being provided by the cable 30, contactor 198 and brush assembly 98, has been represented as the conducting path designated by the numeral 262 in FIG. 15. External wiring to the apparatus 20, represented by a conducting path 266 in FIG. 15, provides a connection from the positive pole of the battery 256 to the other side of the contacts 264. As will be clear from inspection of FIG. 15, electrical energy can be supplied to the stalled vehicle battery 258, to charge such battery, by connecting the clamps 34 and 36 thereto and subsequently energizing the coil 268 of solenoid 72 to close the contacts 264.

The circuit 32 further comprises a transistor 280, the emitter of which is connected to the grounded conducting path 260 and the collector of which is connected to one terminal of the coil 268 of the solenoid 72, the other terminal of such coil being connected to the conducting path 266 such that the transistor 280 and solenoid coil 268 are serially connected to the service vehicle battery 256 via the collector and emitter terminals of the transistor. A diode 282 is placed in parallel with the terminals of the solenoid 268 in the usual reverse biased configuration with respect to the battery 256 for the usual purpose of eliminating induced currents in components connected to the solenoid 72 when the coil thereof is de-energized.

A novel aspect of the present invention is the manner in which the coil 268 of solenoid 72 is energized to close the contacts 264 and thereby effect the supply of a charging current to the battery 258. As noted above, the apparatus 20 comprises the radio transmitter 80 which is carried in the casing 22 and such transmitter is constructed to transmit a coded, radio frequency signal in response to pressure on a button (not shown) on the transmitter. Transmitters of this type are used in garage door opening systems and, accordingly, are readily available. A transmitter which has been found suitable for the present invention is the model CDTB transmitter available from Advance Industries, a division of Overhead Door Corporation, of Appleton, Wis. Complementing this transmitter, the circuit 32 comprises a receiver 270 which is of the type that includes a normally open switch, indicated in dashed lines in FIG. 15 and designated by the numeral 272 therein, and circuitry to close this internal switch at such times that the receiver 270 receives the signal transmitted by the transmitter 80. As in the case of the transmitter, the receiver can be of the type used to open garage doors and a suitable receiver for use in the present invention is the model CDR2 receiver available from Advance Industries. Power is supplied to the receiver 270 via conductors 274 and 276 which are connected to the conducting paths 262 and 260, respectively, so that the power terminals of the receiver 270 are placed across the poles of the battery 256. An antenna 278 is mounted on the service vehicle and connected to the receiver 270 to provide for reception of the signal transmitted by the transmitter 80.

In order to switch the transistor 280 into a conducting state in response to reception of the transmitter signal by the receiver 270, a trigger relay 284, comprised of coil 286 and normally open contacts 288, is provided to establish a conducting path to the base of the transistor 280 when the switch 272 in the receiver 270 is closed. As can be seen in FIG. 15, such conducting path is between the base of the transistor 280 and the positive terminal of the battery 258 of the stalled vehicle, rather than to the positive terminal of the battery 256 of the service vehicle, for a reason that will be discussed below. To establish this path, one terminal of the coil 286 of the relay 284 is connected directly to the conducting path 266, which extends to the positive terminal of the service vehicle battery 256, via conductors 290, 292 and 294. The other terminal of the coil 286 is connected to the grounded conducting path 260, via conductors 296, 298 and 300, via the normally open switch 272 of the receiver 270 so that the coil of relay 284 will be energized to close contacts 288 thereof at such times that the receiver 270 is receiving a signal from the transmitter 80. (As in the case of a solenoid 72, a reverse biased diode 301 is connected across the terminals of relay coil 286. Such diode protects the contacts of switch 272 in the receiver 270.) The contacts 288 of the relay 284, when closed, connect the positive terminal of the stalled vehicle battery 258 to the base of transistor 280 via the clamp 36, the conducting path 262, conductor 302, a biasing resistor 304 and a plurality of diodes 306 which are forward biased with respect to a current from the battery 258 through the base-emitter junction of transistor 280. The purpose of the diodes 306 will be discussed below.

The circuit 32 further comprises a relay 308, whose coil 310 is connected in parallel with a coil 286 of relay 284 so that the relay 308 is also energized upon closure of the switch 272 of receiver 270. The relay 308 has a set of normally open contacts 312 which are serially connected to a resistor 314 and the series combination of the resistor 314 and contacts 312 are connected in parallel with the normally open contacts 264 of the solenoid 72 for a purpose to be discussed below. It will be noted that the resistor 314, when the contacts 312 are closed, provides an alternate conducting path between the batteries 256 and 258 to that provided by the contacts 264 of the solenoid 72.

As noted above, the apparatus 20 is also provided with a horn 74, the purpose of which will be discussed below, and the horn 74 is connected across the battery 258 of the stalled vehicle via a diode 316 whose cathode is connected to the conducting path 262 so as to be in electrical contact with the positive pole of battery 258.

OPERATION OF THE PREFERRED EMBODIMENT

The basic function of the battery jump cable apparatus 20 is to provide a system for temporarily supplying electrical energy to the ignition and starting circuits of a vehicle which has become stalled because of a problem with the battery of the vehicle. Various circumstances can exist with respect to this battery and the apparatus 20 has, in addition to this temporary energy supply capability, a diagnostic function which will be discussed below. In order that the apparatus 20 can conveniently carry out these functions, the apparatus 20 is mounted, as discussed above, on a service vehicle so that the owner of a vehicle which will not start can readily obtain aid to correct the problem with his vehicle by placing a telephone call to have the service vehicle dispatched to the location of the stalled vehicle.

When the service vehicle arrives at the location of the stalled vehicle, the service vehicle can be parked in a position that is convenient in view of the traffic situation at hand and the cables 28 and 30 are provided with a length sufficient to permit the service vehicle to be placed so as not to interfere with traffic in any situation which is likely to be encountered. A suitable length for the cables 28 and 30 has been found to be 25 feet. Following the parking of the service vehicle, the lid 60 that closes the battery clamp storage compartment formed by the member 58 of the casing 22 is opened so that the cables 28 and 30 can be drawn from the reel 24 to the stalled vehicle. At some point in the withdrawal of the cables from the reel, the nose 240 of the ratchet lock 90 will become aligned with one of the second segments 222 of the ratchet wheel 88 so that further pivotation of the ratchet wheel 88 will pivot the ratchet lock in the first direction 244 and such pivotation of the ratchet lock 90 will be repeated each time the nose 240 is engaged by a first segment of the ratchet wheel 88. When sufficient cable has been drawn from the reel 24, the service vehicle operator discontinues the withdrawal of the cables with the nose of the ratchet lock 90 in engagement with a first segment of the ratchet wheel. Since the ratchet lock has been pivoted in the first direction 244, the ratchet wheel and ratchet lock will be engaged as shown in FIG. 12 to hold the reel 24 in place against the force exerted by the return spring 86 tending to urge the spool to rotate in the second direction 144; that is, in a direction to take up the cables 28 and 30 on the reel 24. The clamps 34 and 36 are then used to connect the battery 258 of the stalled vehicle to the circuit 32.

It will be noted that, at the time the connection to the battery 258 is made, no electrical path exists between the service vehicle battery 256 and the clamp 36 so that the two batteries remain disconnected following the initial attachment of the clamps. That is, the coils of solenoid 72 and relay 308 are de-energized so that the normally open contacts 264 and 312 thereof remain open following the attachment of the clamps. Similarly, the base of transistor 380 is isolated via the normally open contacts of relay 288. However, when the clamps 34 and 36 are attached to the battery 258, a circuit is completed through the horn 74 and the diode 316. The completion of this circuit upon attachment of the clamps 34 and 36 in conjunction with the isolation of the batteries from each other and the isolation of the base of transistor 280 serves several purposes. Initially, it is necessary that the clamps be connected to the battery 258 so that the positive terminals of the two batteries will be connected when the contacts 264 of solenoid 72 are closed. The horn 74 is selected to give an audible warning in response to only a small current therethrough, a 9 volt-amp horn of the type readily available in electronics supply stores being suitable for this purpose. In most circumstances, the horn will provide a warning should the cables be improperly connected to the battery 258. That is, because of the low power requirements of the horn 74, a battery which is discharged to the point that it cannot be used to start a vehicle will usually still be capable of actuating a low power horn such as the horn 74. The connection to the battery 258 can be checked by momentarily touching the clamps to the poles of the battery 258 with a reverse connection so that the horn 74 is momentarily sounded.

Following the connection of the clamps 34 and 36 to the battery 258, the operators of the two vehicles can move away from the battery of the stalled vehicle to avoid any danger that might exist when power is applied to the battery of the stalled vehicle. Energy is then supplied to the stalled vehicle by pressing the transmission button of the transmitter 88.

In most circumstances, the battery 258 will retain sufficient charge that it will be able to trigger the transistor 280 into conduction when the relay contacts 288 are closed and, in such circumstances, the operation of the circuit 32 will be as follows. When the receiver 270 receives the signal from the transmitter 80, switch 272 closes to energize the coil of relay 284, thereby closing contacts 288. Current is thus supplied to the base of transistor 280 from the battery of the stalled vehicle to switch the transistor 280 into a conducting state and thereby energize solenoid coil 268 to close contacts 264 and complete a circuit between the two batteries. (The low power requirements of the transistor base circuit will insure the switching of the transistor 280 even though battery 258 is discharged to the point that it will not operate the starter motor of the stalled vehicle.)

The connection of the base of the transistor 280 to the battery of the stalled vehicle, rather than to the battery of the service vehicle further insures that the clamps 34 and 36 are properly connected to the battery 258 of the stalled vehicle. If the connection is improper, the base-emitter junction of the transistor 280 will be reverse biased so that the transistor 280 will not conduct following closure of the contacts 288 of relay 284, a fact that will be signaled by the failure of the starter motor of the stalled vehicle to operate following depression of the transmission button of the transmitter 280.

It will be noted that an alternate electrical path to the base of transistor 280 will have been formed from the service vehicle battery 256 when the switch 272 of receiver 270 is closed, such path extending through the resistor 314 via the contacts 312 of relay 308 which are closed at the same time that the contacts of relay 284 are closed. For a purpose to be described below, the resistor 314 is selected to have a relatively small resistance value, such value suitably being about 5 ohms. Any current through this resistor will cause a voltage drop in the signal that might be supplied to the base of transistor 280 via the resistor 314 and such drop is used to prevent the transistor 280 from turning on in response to closure of contacts 312 while still permitting switching of the transistor 280 by the battery 258 of the stalled vehicle. This is accomplished by means of the diodes 306, the forward voltage drop of such diodes providing a convenient means for adjusting the circuit 32 such that the transistor 280 will switch into a conducting state when supplied with a base current from the battery 258 but will not switch when supplied with a base current from battery 256 via resistor 314. It has been found that, for a 2N3055 transistor and a value for the biasing resistor 304 of 35 ohms, three 1N4004 diodes will suffice for the circuit 32 to differentiate between the two possible sources of the base current where the batteries 256 and 258 are lead acid batteries of 12 volt automotive vehicle electrical systems.

The resistor 314 becomes useful when the battery 258 has been severely discharged but has not been damaged; for example, by the shorting of a cell of the battery 258. In such circumstances, the battery 258 will not be capable of switching the transistor 280 into conduction when the contacts 288 are initially closed. The concurrent closure of the contacts 312 in such case can be used to charge the battery 258 through the resistor 314 to a degree sufficient to permit the battery 258 to switch the transistor 280 into a conducting state. Because of the relatively low, but non-zero, resistance of the resistor 314, such charging of the battery 258 can be accomplished in a few minutes without danger of damaging either battery should the clamps 34 and 36 have been improperly connected to the battery 258. Thereafter, the charging of the battery 258 proceeds as has been described above.

If the battery 258 fails to operate the starting motor of the stalled vehicle after a few minutes has elapsed following the depression of the transmission button of the transmitter 80, such fact indicates either that the cables 34 and 36 are improperly connected, a possiblity that can often be easily checked following failure of the stalled vehicle to start after recharging through the resistor 314 by momentarily reversing the connection of the clamps 34 and 36 to the battery 258 as has been described above, or that a more serious problem, such as a dead cell in the battery 258 exists so that the owner of the stalled vehicle is apprised that other measures than charging the battery 258 must be taken. Should the battery 258 be discharged to the point that the battery 258 is incapable of operating the horn 74, the above described construction of the circuit 32 provides an alternative test for whether the clamps are properly connected. In particular, because of the presence of a charging circuit in the stalled vehicle, not only will the vehicle not start if the clamps are improperly connected but the solenoid 72 will not be energized. As is known to those skilled in the art, the charging circuit of the stalled vehicle includes rectifiers that conduct a conventional current to the positive pole of the battery of such vehicle while acting as a short circuit, through the alternator or generator, to a reverse current. As a result, substantially the entire potential differences across the service vehicle battery will be dropped across resistor 314 so that, even should some reverse charging of the battery 258 occur, the voltage at the base of transistor 280 will be insufficient to cause transistor 280 to conduct and energize the coil of solenoid 72. On the other hand, where the clamps are properly connected, the battery 258 will usually, even though dead, receive a sufficient charge to cause conduction by the transistor 280. Thus, if the starter motor of the stalled vehicle will not start within a few minutes of pressing the transmission button on the transmitter 80 and the solenoid does not energize, such energization producing an audible signal, it will be clear to the operator of the service vehicle that the clamps are improperly connected. If, on the other hand, the battery 258 contains a dead cell, the noise of energization of the solenoid 72, coupled with the failure of the stalled vehicle to start, will provide an indication of such condition of the battery 258.

Following the use of the battery jump cable apparatus 20 to start the stalled vehicle, assuming that the battery 258 is merely discharged, the batteries 256 and 258 can again be isolated by releasing pressure on the transmission button of the transmitter 80. With the cessation of the transmission of a signal by the transmitter 80, the switch 272 in the receiver 270 opens to de-energize coil 286 of relay 284 and open contacts 288 in the base circuit of transistor 280. The transistor 280 accordingly switches to a non-conducting state to de-energize the coil of solenoid 72 and open contacts 264 between the service vehicle battery 256 and clamp 36. The cables 28 and 30 can then be withdrawn a short additional distance from the casing 22 to permit a second segment of the ratchet wheel 88 to come into alignment with the ratchet lock 90 so that the reel 24 can be switched from the locking mode to the free rotation mode as has been described above. Thereafter, the spring 86 turns the spool 26 to wind the cables on the spool 26 until the cables 28 and 30 have been drawn into the casing 22 and the clamps can be hooked on the limiting shaft 82. The transmitter 80 is then replaced in the shelf 78 and the lid 60 is closed to complete the service call for the service vehicle.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. An improved battery jump cable apparatus for supplying electrical energy from the battery of a service vehicle to the battery of a second vehicle, comprising:
   a pair of jumper cables each having a clamp on a free end thereof for connecting the cables to the battery of the second vehicle;
   a casing mounted on the service vehicle;

a reel disposed within the casing, the reel adapted for alternatively paying out and retrieving the jumper cables, the reel comprising:
  a frame;
  a spool having a spool axis about which the jumper cables can be wrapped on the spool, wherein the spool is mounted on the frame for rotation in opposed first and second directions about the spool axis, and wherein portions of each of said cables near one end thereof opposite said free ends are secured to the spool for wrapping the cable on the spool via rotation of the spool in the second direction;
  means for urging the spool to rotate in the second direction;
  a ratchet lock mounted on the frame for pivotation about an axis spaced from the spool axis and substantially parallel thereto, the ratchet lock having a protruding nose portion extending generally toward the spool axis in a neutral position of the ratchet lock;
  means for urging the ratchet lock toward the neutral position at such times that the ratchet lock is pivoted to either side of the neutral position;
  a ratchet wheel secured to the spool coaxially with the spool and in lateral alignment with the ratchet lock, the ratchet wheel having at least one first segment having a plurality of teeth formed thereon along an arc of a circle centered on the spool axis and intersected by the nose portion of the ratchet lock in the neutral position of the ratchet lock, and the ratchet wheel having at least one second segment of a radius insufficient for engagement of the second segment with the nose portion of the ratchet lock; and
  means for limiting the rotation of the spool so as to align the nose portion of the ratchet lock with portions of a second segment of the ratchet wheel at a limit of rotation of the spool in the first direction defined by the cables being fully paid out from said reel;
a solenoid mounted on the casing, the solenoid having a set of normally open contacts and a coil energizable for closing said contacts, one side of said contacts electrically connected to one pole of the service battery;
first connecting means for electrically connecting the other side of said solenoid contacts to one of said jumper cables at said reel;
second connecting means for electrically connecting the other pole of the service battery to the other of said jumper cables at said reel;
receiver means disposed within said casing for energizing the coil of the solenoid in response to reception by the receiver means of a coded electromagnetic signal at a preselected frequency; and
a transmitter operable to transmit said coded signal of said preselected frequency.

2. The battery jump cable apparatus of claim 1 wherein the frame comprises:
  a first cross arm extending across one end of the spool;
  a second cross arm extending across the other end of the spool;
  means for connecting the ends of the first cross arm to the ends of the second cross arm;
  a first stub axle mounted on central portions of the first cross arm and extending toward the second cross arm along the spool axis;
  a second stub axle mounted on the second cross arm substantially coaxially with the first stub axle and extending toward the first stub axle, the second stub axle having an axial slot formed in portions thereof adjacent the distal end of the second stub axle;
wherein the spool comprises:
  a first end plate rotatably mounted on the first stub axle;
  a second end plate rotatably mounted on the second stub axle; and
  a tubular body member connected to the end plates and extending therebetween about the stub axles, the body portion of the spool having a recess formed in the inner peripheral surface thereof; and
wherein the means for urging the spool to rotate in the second direction comprises a spiral spring disposed within the body portion of the spool about the second stub axle, portions of the spiral spring near one end thereof disposed in the slot formed in the second stub axle and portions of the spiral spring near the other end thereof disposed in the recess in the body portion of the spool.

3. The battery jump cable apparatus of claim 2 wherein the means for limiting the rotation of the spool comprises a pair of clamps, one clamp mounted on each of the end plates and engaging portions of one of the cables to fix the angular relation of the spool on the frame at such times that the cables are fully withdrawn from the reel.

4. The battery jump cable apparatus of claim 1 or claim 2 further comprising a roller rotatably mounted on the frame in a parallel relation with the spool axis and in lateral alignment with the spool, the roller comprising:
  a central body portion;
  a first enlarged end portion; and
  a second enlarged end portion;
wherein the end portions of the roller are characterized as having facing frusto-conical surfaces formed thereon.

5. The battery jump cable apparatus of claim 1 or claim 2 wherein the ratchet wheel is characterized as having two first segments separated by two second segments.

6. The battery jump cable apparatus of claim 1 or claim 2 wherein the ratchet wheel is formed unitarily with a portion of the spool.

7. An improved reel for a cable, comprising:
  a frame;
  a spool having a spool axis about which the jumper cables can be wrapped on the spool, wherein the spool is mounted on the frame for rotation in opposed first and second directions about the spool axis, wherein a portion of the cable near one end thereof is secured to the spool for wrapping the cable on the spool via rotation of the spool in the second direction;
  means for urging the spool to rotate in the second direction;
  a ratchet lock mounted on the frame for pivotation about an axis spaced from the spool axis and substantially parallel thereto, the ratchet lock having a protruding nose portion extending generally toward the spool axis in a neutral position of the ratchet lock;

means for urging the ratchet lock toward the neutral position at such times that the ratchet lock is pivoted to either side of the neutral position;

a ratchet wheel secured to the spool coaxially with the spool and in lateral alignment with the ratchet lock, the ratchet wheel having at least one first segment having a plurality of teeth formed thereon along an arc of a circle centered on the spool axis and intersected by the nose portion of the ratchet lock in the neutral position of the ratchet lock, and the ratchet wheel having at least one second segment of a radius insufficient for engagement of the second segment with the nose portion of the ratchet lock; and means for limiting the rotation of the spool so as to align the nose portion of the ratchet lock with portions of a second segment of the ratchet wheel at a limit of rotation of the spool in the first direction defined by the cable being fully paid out from said reel.

8. The reel of claim 7 wherein the frame comprises:
a first cross arm extending across one end of the spool;
a second cross arm extending across the other end of the spool;
means for connecting the ends of the first cross arm to the ends of the second cross arm;
a first stub axle mounted on central portions of the first cross arm and extending toward the second cross arm along the spool axis;
a second stub axle mounted on the second cross arm substantially coaxially with the first stub axle and extending toward the first stub axle, the second stub axle having an axial slot formed in portions thereof adjacent the distal end of the second stub axle;
wherein the spool comprises:
a first end plate rotatably mounted on the first stub axle;
a second end plate rotatably mounted on the second stub axle; and
a tubular body member connected to the end plates and extending therebetween about the stub axles, the body portion of the spool having a recess formed in the inner peripheral surface thereof; and
wherein the means for urging the spool to rotate in the second direction comprises a spiral spring disposed within the body portion of the spool about the second stub axle, portions of the spiral spring near one end thereof disposed in the slot formed in the second stub axle and portions of the spiral spring near the other end thereof disposed in the recess in the body portion of the spool.

9. The reel of claim 8 wherein the means for limiting the rotation of the spool comprises a clamp mounted on one of the end plates and engaging portions of the cable to fix the angular relation of the spool on the frame at such times that the cable is fully withdrawn from the reel.

10. The reel of claim 7 or claim 8 further comprising a roller rotatably mounted on the frame in a parallel relation with the spool axis and in lateral alignment with the spool, the roller comprising:
a central body portion;
a first enlarged end portion; and
a second enlarged end portion;
wherein the end portions of the roller are characterized as having facing frusto-conical surfaces formed thereon.

11. The reel of claim 7 of claim 8 wherein the ratchet wheel is characterized as having two first segments separated by two second segments.

12. The reel of claim 7 or claim 8 wherein the ratchet wheel is formed unitarily with a portion of the spool.

13. An improved battery jump cable apparatus for supplying electrical energy from the battery of a service vehicle to the battery of a second vehicle, comprising:
a pair of jumper cables each having a clamp on a free end thereof for connecting the cables to the battery of the second vehicle;
a casing mounted on the service vehicle;
a reel disposed within the casing, the reel adapted for alternatively paying out and retrieving the jumper cables, the reel comprising:
a spool adapted for winding the cables thereon, the spool comprising:
a circular first end plate constructed of an insulating material, the first end plate having an interior side and an exterior side;
a circular second end plate constructed of an insulating material, the second end plate having an interior side and an exterior side; and
a tubular body portion connected between the interior sides of the end plates so as to position the end plates in a coaxial, substantially parallel relation, the tubular body portion being coaxial with the end plates; and
means for pivotally supporting the spool for rotation about the axes of the end plates and body portion;
a solenoid mounted on the casing, the solenoid having a set of normally open contacts and a coil energizable for closing said contacts, one side of said contacts electrically connected to one pole of the service battery;
first connecting means for electrically connecting the other side of said solenoid contacts to one of said jumper cables at said reel;
second connecting means for electrically connecting the other pole of the service battery to the other of said jumper cables at said reel;
receiver means disposed within said casing for energizing the coil of the solenoid in response to reception by the receiver means of a coded electromagnetic signal at a preselected frequency; and
a transmitter operable to transmit said coded signal of said preselected frequency;
wherein each of the end plates is characterized as having a radially extending groove formed in the exterior surface thereof, portions of the grooves near the outer periphery of the end plates extending through the end plates to intersect the interior surfaces thereof; and
wherein each of the connecting means comprises:
a metal ring mounted on the exterior surface of one of the end plates and having a radially extending tab disposed in the radially extending groove in the exterior surface of such end plate, each tab connected to the fixed end of one of the jumper cables with the portions of the grooves that extend through the end plates; and
brush means fixed with respect to the casing for providing a conducting path from a fixed location within the casing to the metal ring.

14. The battery jump cable apparatus of claim 13 wherein the brush means comprises:
a sleeve constructed of an insulating material and having an annular groove formed in one side thereof, the sleeve further having a groove extending radially from said annular groove in said one side of the sleeve;

an annular, slip ring disposed in said groove and having a metal tab connected thereto, said tab extending radially from the slip ring in the radially extending groove of the sleeve; and means disposed within the sleeve for urging the slip ring outwardly of the annular groove.

* * * * *